Feb. 22, 1955   O. W. BURKHARDT   2,702,538
CHAIN SAW FOR STONE WORKING

Filed Aug. 10, 1951   4 Sheets-Sheet 1

INVENTOR
*Otto W. Burkhardt*

BY *Young, Evans & Thompson*
ATTORNEYS

Feb. 22, 1955     O. W. BURKHARDT     2,702,538
CHAIN SAW FOR STONE WORKING
Filed Aug. 10, 1951     4 Sheets-Sheet 2
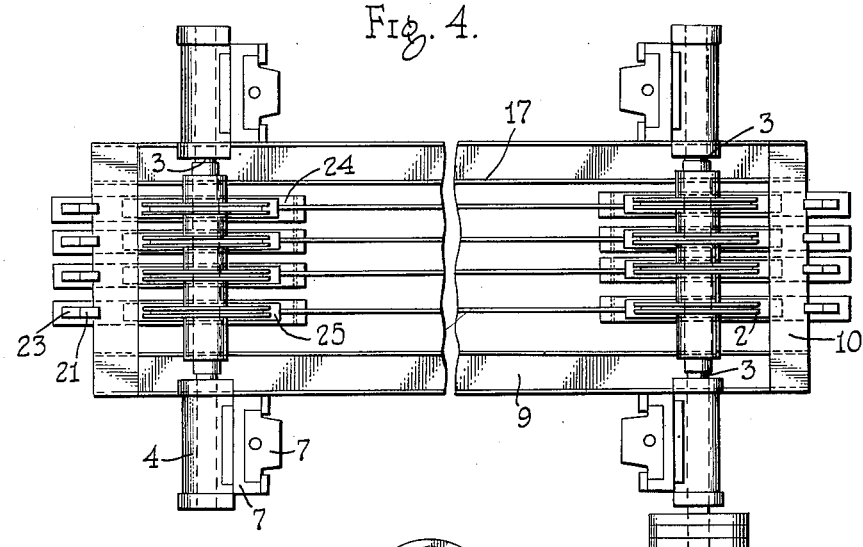
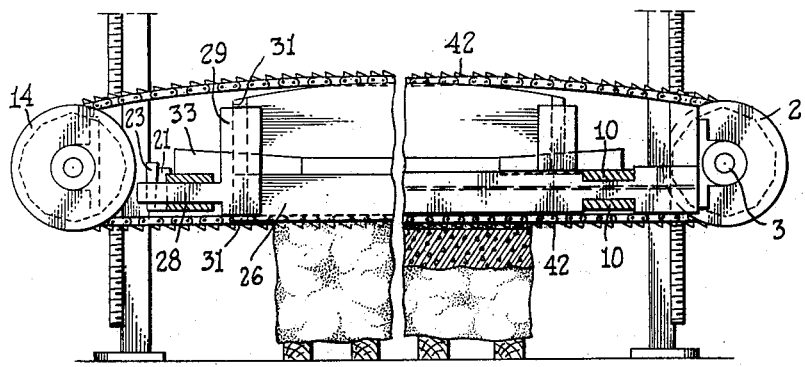
INVENTOR
OTTO W. BURKHARDT
BY
ATTORNEYS

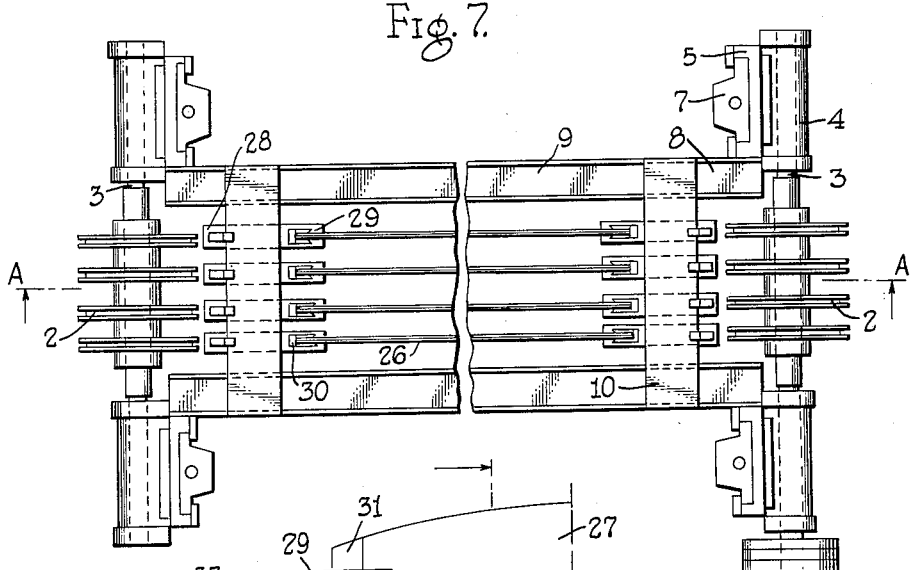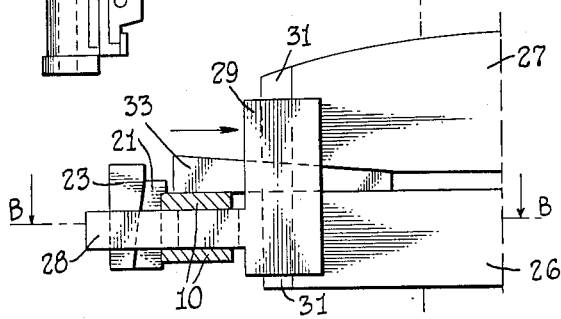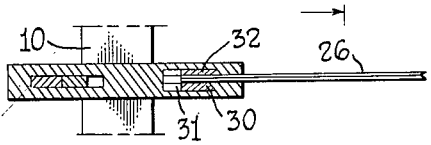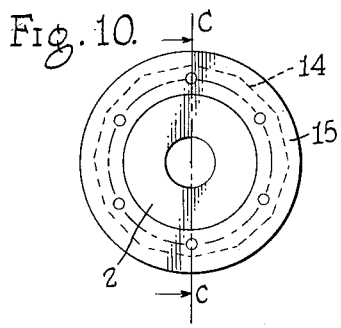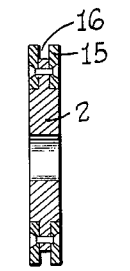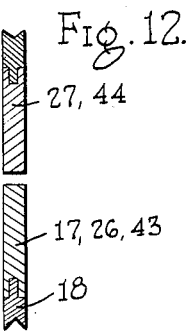
INVENTOR
*Otto W. Burkhardt*
BY *Young, Emery & Thompson*
ATTORNEYS Feb. 22, 1955  O. W. BURKHARDT  2,702,538
CHAIN SAW FOR STONE WORKING
Filed Aug. 10, 1951  4 Sheets-Sheet 4
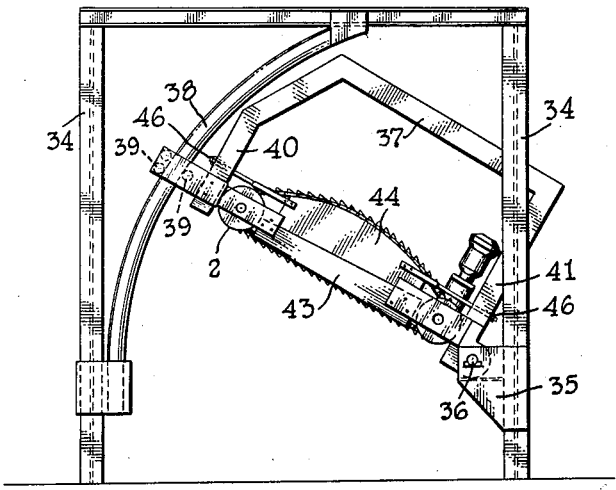
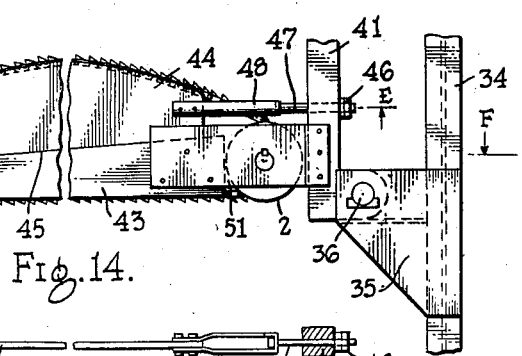
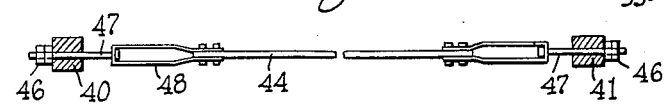
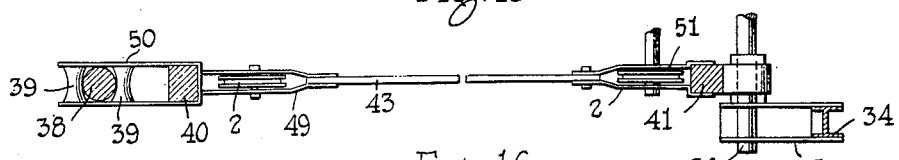
INVENTOR
OTTO W. BURKHARDT
BY *Young, Emery & Thompson*
ATTORNEYS

United States Patent Office 2,702,538
Patented Feb. 22, 1955

2,702,538
CHAIN SAW FOR STONE WORKING

Otto Wilhelm Burkhardt, Bayreuth, Germany

Application August 10, 1951, Serial No. 241,336

Claims priority, application Germany August 10, 1950

7 Claims. (Cl. 125—21)

This invention relates to endless chain saws and has for its objects to provide certain improvements in the construction and arrangement of the several parts whereby the machine is materially strengthened and its operation facilitated; means being employed for tensioning the guiding blade of the endless chain and, in the case of using a plurality of chains, for tightening the individual chain independently of each other.

These and further features of the invention are to be seen from the following description of the drawings which show some embodiments of the invention.

Figure 2:
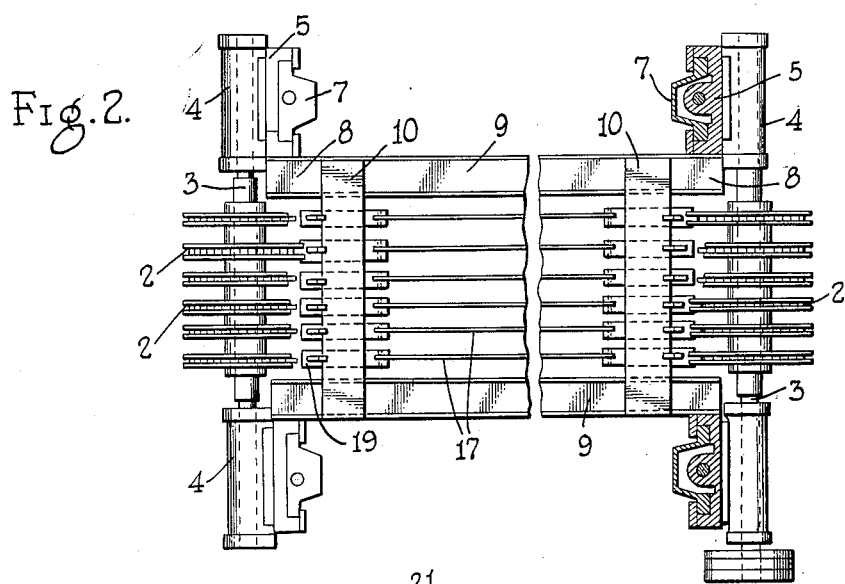
Fig. 2 is a plan view of Fig. 1, the side uprights being shown in section.
Figure 3:
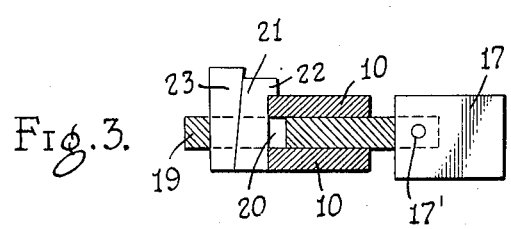

Fig. 3 is an enlarged detail sectional view showing a part of a guiding blade and its supporting means, Fig. 4 is a similar plan view as Fig. 2 of a saw the shaft of the rollers of which being supported inside the adjustable frame, Fig. 5 is a detail sectional view showing a means for stretching or tensioning the guiding blade, Fig. 6 is a longitudinal section taken in the plane of the line A—A of Fig. 7 showing a modified construction of a chain saw, each saw being provided with two guiding blades, Fig. 7 is a plan view of Fig. 6, Fig. 8 is a front view of the one end of the two guiding blades and the associated parts in an enlarged scale, partly in a sectional view, Fig. 9 is a horizontal section taken in the plane of the line B—B in Fig. 8, Fig. 10 is a side view of a chain guiding roller shaped like a polygon, Fig. 11 is a section taken in the plane of line C—C in Fig. 10, Fig. 12 is a section through the two guiding blades taken in the plane of the line D—D in Fig. 8, Fig. 13 is a side elevation of a further embodiment of the invention showing a chain saw shaped like a bow saw, Fig. 14 is a side view of the guiding blades and the tensioning device in an enlarged scale, Fig. 15 is a section taken in the plane of the line E—E in Fig. 14 the means for tightening the upper blade, Fig. 16 is a section taken in the plane of the line F—F through the tightening means of the lower blade.

The invention is shown in the drawing in connection with a stone cutting machine. The work piece or the stone to be cut is denoted by 1. The machine comprises six chain saws guided each by four guiding rollers 2. The shafts 3 of the individual groups of rollers are supported by oppositely arranged bearings 4 provided at supports 5 guided by column-like uprights 7 and fitted to slide along said uprights up and down. These supports are provided with lugs engaging rotary vertical screws 6 driven in a manner known per se by any liable means.

Referring now to Fig. 2, the supports 5 are fastened at the elongated end portions 8 of the longitudinal beams 9 forming, together with the cross beams 10, a rectangular frame. According to Fig. 2 the shafts 3 of the guiding rollers 2 are located outside this frame while in the embodiment of Fig. 4 these shafts run parallelly to the cross beams within the frame 9, 10.

Each of the individual chains is stretched by two stretching rolls 11 and 12 subject to the action of a stretching weight 13 which, of course, may also be substituted by a spring or the like.

The guiding rollers 2, as preferably may be seen from Figs. 5–10, are suitably provided with circumference 14 shaped like a polygon for securing the correct driving of the sawing chains. The rollers 2 are preferably provided with two lateral rings 15 (Fig. 11) forming radially projecting guiding edges and with a guiding notch 16 for the chain.

According to the invention, to each chain saw a guiding blade 17 is associated along the lower side of which the chain slides. This blade secures that the chain to be guided rectilinearly so that no curved cutting line may arise. These guiding blades 17 are preferably provided with strips 18 along their guiding edge, the strips consisting of a harder material than that of the guiding blades. Thereby the premature tear and wear of the guiding blades is avoided. The strips 18 may be connected with the blades 17 by a slot and key connection as shown in Fig. 12. Preferably these strips are V- or roof-like so as to correctly guide the chain in the lateral direction.

The individual guiding blades 17 may be separately tightened. Therefore they are connected by pivots 17' each with a wedge hinge 19 inserted, in the embodiment illustrated in the drawing, between the cross beams 10 of the frame 9, 10, said beams consisting of two parallel ledges. An abutment 21 is inserted into a slot 20 of the wedge hinge, the nose 22 of which abutment rests on the cross beam 10. The guiding blade 17 may be tightened more or less by means of a wedge 23.

Figure 1:
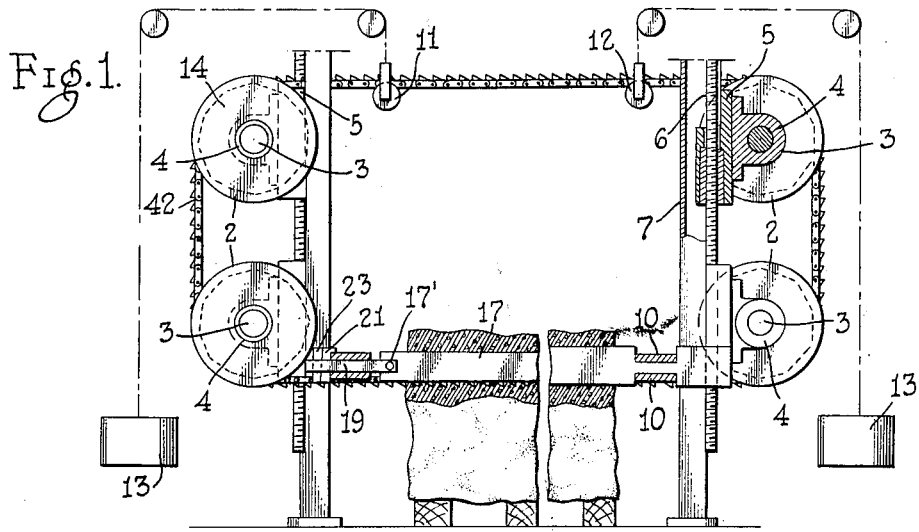
Fig. 1 is a side view of a chain saw, the supporting side uprights being shown partially in section.

In the embodiment of the invention shown in Fig. 4, the shafts 3 of the guiding rollers are arranged inside the frame 9, 10 therefore correspondingly elongated wedge hinges 24 are necessary, provided with slots 25 embracing the guiding rollers laterally. Otherwise the mechanism can be constructed as described above with respect to Figs. 1–3.

Figs. 6 to 9 show a chain saw in which only two guiding rollers are associated to each chain saw. Besides, for each chain two superimposed guiding blades 26 and 27 are provided. The lower blade 26 acts in the same manner as the guiding blade 16 described above, i. e. it serves for guiding the chain saw in a straight line. The upper blade 27 serves preferably for stretching the chain. The distance of the two blades 26 and 27 from each other may be adjusted and the greater the distance of these blades the stronger is the tension.

For this reason the wedge hinge 28 which comprises an abutment 21 and a wedge 23 is provided with a holding arm 29 extending rectangularly thereto, which arm is pushed by means of a dovetailed recess 30 over the ledges 31 and 32 fastened at opposite sides of the blades 26 and 27. Therefore, both blades are tightened by the wedge 23 in the longitudinal direction. On the other hand these blades are driven asunder if a horizontal wedge 33 is moved in the direction of the arrow X thereby stretching the chain.

In Figs. 6 and 7 the chain saw has the shafts 3 of the guiding rollers arranged outside the frame 9, 10, but of course the shaft 3 may also be arranged inside the frame 9, 10 similar to Fig. 4.

The invention may also be used in connection with saws shaped like a bow saw. Such saw is illustrated in Figs. 13–16. A bearing frame 34 provided with two vertical uprights carries a bracket 35 adjustable with respect to its level. To this bracket the bow 37 is pivoted at 36. The bow is guided along a guiding rail 38 when rocking up and down and for this purpose it is provided with guiding rollers 39.

Between the two legs 40 and 41 of the bow 37 the chain saws 42 are arranged guided by two guiding rollers in a similar way as shown with the saws illustrated in Figs. 6 and 7. To each saw 42 two superimposed guiding blades 43 and 44 are associated. The opposite edges of these two blades are wedge like shaped so that the chain is stretched by displacing the upper blade 44 relatively to the lower blade 43 towards the right hand side. This may be done by adjusting the nuts 46 along the screws 47 fastened to holding ledges 48 connected to the upper blade 44.

The lower blade 43 is provided with similar holding ledges 49 between which the guiding roller 2 is inserted (Fig. 16). The ledges 49 change into the bow like wedge hinge 50 embracing the bow frame 37 and the guiding rail 38 and supporting the guiding rollers 39. Besides, an abutment with a tightening wedge is inserted in this wedge hinge in the manner described above. At the opposite side the lower blade 43 is solidly connected with the leg 41 of the bow frame 37 by a suitable holding ledge 51.

What I claim is:

1. A machine of the character described, comprising an endless chain saw, a frame composed of longitudinal and cross beams, column-like uprights for said frame, means for raising and lowering said frame, a guide blade for the saw, connecting means connecting said guide blade with the cross beams of said frame and being adapted to tighten the guide blade and to change the adjusted tension, and means for driving the saw, said connecting means connecting the guide blade with the cross beams and comprising wedges supported by said cross beams and wedge hinges connected with said blade and coacting with said wedges.

2. A machine of the character described, comprising a plurality of endless chain saws, a frame composed of longitudinal and cross beams, column-like uprights for said frame, means for raising and lowering said frame, means for stretching the individual chains independently of each other, a guide blade for each of the said chain saws, connecting means connecting each of said guiding blades with the cross beams of said frame and being adapted to tighten the individual guide blades independently of each other and to change their adjusted position, and means for driving the saws.

3. In a machine of the character described, a plurality of endless chain saws, rollers for guiding said chain saws, shafts for carrying said rollers, supports for supporting said shafts, a frame connecting said supports and comprising longitudinal and cross beams, column-like uprights along which the said frame may be raised and lowered, means for raising and lowering said frame, the said supports for supporting the shafts being positioned inside said frame, means for tensioning the individual chains independently of each other, a guide blade for each of the said chain saws, connecting means connecting each of said guiding blades with the cross beams of said frame and being adapted to tighten the individual guide blades independently of each other and to change their adjusted position, said connecting means comprising wedges supported by said cross beams and wedge hinges connected with said blades and coacting with said wedges, said wedge hinges being provided with longitudinal slots adapted to be engaged by said rollers, and means for driving the saws.

4. In a machine of the character described, a plurality of endless chain saws, rollers for guiding said chain saws, shafts for carrying said rollers, supports for supporting said shafts, a frame connecting said supports and comprising longitudinal and cross beams, column-like uprights along which the said frame may be raised and lowered, means for raising and lowering said frame, elongated portions provided at said longitudinal beams outside said frame and supporting said supports, means for tensioning the individual chains independently of each other, a guide blade for each of the said chain saws, connecting means connecting each of said guiding blades with the cross beams of said frame and being adapted to tighten the individual guide blades independently of each other and to change their adjusted position and means for driving the saws.

5. In a machine of the character described, an endless chain saw, supports for supporting it, a frame connecting said supports and comprising longitudinal and cross beams, column-like uprights along which the said frame may be raised and lowered, two superimposed guiding blades for the saw arranged between the two sides of the saw and adapted to be adjustedly relatively to each other with respect to their distance thereby adjusting the tension of the said chain, means for raising and lowering said frame, connecting means connecting said guide blades with the cross beams of said frame and being adapted to tighten the guide blades and to change the adjusted tension, means for changing the distance between the two guide blades and means for driving the saw.

6. In a machine of the character described, an endless chain saw, supports for supporting it, a frame connecting said supports and comprising longitudinal and cross beams, column-like uprights along which the said frame may be raised and lowered, two super-imposed guiding blades, the lower one being stationary and having a straight lower side engaging the lower side of said chain and the upper guiding blade having a curved upper side engaging the upper side of said chain and being adjustable with respect to its distance from the lower blade, thereby adjusting the tension of the said chain, means for raising and lowering said frame, connecting means connecting said guide blades with the cross beams of said frame and being adapted to tighten the guide blades and to change the adjusted tension, means for changing the distance between the two guide blades and means for driving the saw.

7. A chain saw as claimed in claim 3, said rollers being shaped like polygons.

References Cited in the file of this patent

UNITED STATES PATENTS

| | | |
|---|---|---|
| 397,244 | Melchoir et al. | Feb. 5, 1889 |
| 508,825 | Jeansanme | Nov. 14, 1893 |
| 1,043,433 | Jackson | Nov. 5, 1912 |